(12) United States Patent
Drexler

(10) Patent No.: US 6,199,761 B1
(45) Date of Patent: *Mar. 13, 2001

(54) VALIDATION METHOD FOR ELECTRONIC CASH CARDS AND DIGITAL IDENTITY CARDS UTILIZING OPTICAL DATA STORAGE

(75) Inventor: Jerome Drexler, Los Altos Hills, CA (US)

(73) Assignee: Drexler Technology Corporation, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/236,769

(22) Filed: Jan. 25, 1999

Related U.S. Application Data

(63) Continuation-in-part of application No. 08/762,978, filed on Dec. 9, 1996, now Pat. No. 5,932,865.

(51) Int. Cl.$^7$ .............................. G06K 7/10; G06K 19/00
(52) U.S. Cl. .......................... 235/487; 235/380; 235/382; 235/454
(58) Field of Search ................................... 235/375, 379, 235/380, 382.5, 382, 459, 487

(56) References Cited

U.S. PATENT DOCUMENTS

| | | | |
|---|---|---|---|
| 4,230,939 | 10/1980 | de Bont et al. | 235/488 |
| 4,269,917 | 5/1981 | Drexler et al. | 430/16 |
| 4,278,756 | 7/1981 | Bouldin et al. | 430/414 |
| 4,278,758 | 7/1981 | Drexler et al. | 430/616 |
| 4,298,684 | 11/1981 | Bouldin et al. | 430/616 |
| 4,314,260 | 2/1982 | Drexler | 346/76 L |
| 4,500,777 | 2/1985 | Drexler | 235/487 |
| 4,544,835 | 10/1985 | Drexler | 235/487 |
| 4,634,850 | 1/1987 | Pierce et al. | 235/487 |
| 4,680,459 | 7/1987 | Drexler | 235/487 |
| 4,683,371 | 7/1987 | Drexler | 235/487 |
| 4,711,996 | 12/1987 | Drexler | 235/468 |
| 4,745,484 | 5/1988 | Drexler et al. | 358/227 |
| 4,814,594 | 3/1989 | Drexler | 235/487 |
| 4,864,630 | 9/1989 | Arnold et al. | 382/46 |
| 4,982,073 | 1/1991 | Stenzel | 235/454 |
| 5,068,894 | 11/1991 | Hoppe | 380/23 |
| 5,070,490 | 12/1991 | Endo | 369/44.26 |
| 5,134,773 | 8/1992 | LeMaire et al. | 29/827 |
| 5,151,582 | 9/1992 | Fujioka | 235/469 |
| 5,162,638 | 11/1992 | Diehl et al. | 235/380 |
| 5,291,006 | 3/1994 | Nishiguma et al. | 235/454 |
| 5,306,899 | 4/1994 | Marom et al. | 235/382 |
| 5,336,871 | 8/1994 | Colgate, Jr. | 235/380 |
| 5,365,655 | 11/1994 | Rose | 29/627 |
| 5,416,306 | 5/1995 | Imahata | 235/380 |
| 5,446,273 | 8/1995 | Leslie | 235/487 |
| 5,457,747 | 10/1995 | Drexler et al. | 380/24 |
| 5,514,856 | 5/1996 | Kitahara et al. | 235/440 |
| 5,619,025 | 4/1997 | Hickman et al. | 235/454 |
| 5,932,865 | * 8/1999 | Drexler | 235/487 |
| 6,068,301 | * 5/2000 | Han et al. | 235/380 |

OTHER PUBLICATIONS

"Smart Cards" by Jose Luis Zoreda et al., (1994), pp. 2–7.
HP Press Release, "HP, RSA Data Security and Wave Systems to Enable Enhanced Security for E–Mail and Internet Transactions", Jan. 20, 1999.

\* cited by examiner

Primary Examiner—David P. Porta
Assistant Examiner—Drew A. Dunn
(74) Attorney, Agent, or Firm—Thomas Schneck

(57) ABSTRACT

A method for inhibiting the counterfeiting of electronic cash smart cards that use microchips for monetary stored value or digital identity cards that use microchips to control the transfer of data. Such electronic cash cards have recently been counterfeited by the use of electronic techniques to break the security codes. Such counterfeiting can be inhibited by bonding an optical memory stripe to the smart card with pre-recorded or post-recorded validation data at one or multiple locations on the cards. This optical validation data would be read with a photodetector array and could be transmitted to the recipient during funds transfer and/or used locally to control dispensing of cash or data. Thus successful counterfeiting of the modified electronic cash or digital identity card would require meeting exacting electronic and optical requirements.

13 Claims, 3 Drawing Sheets

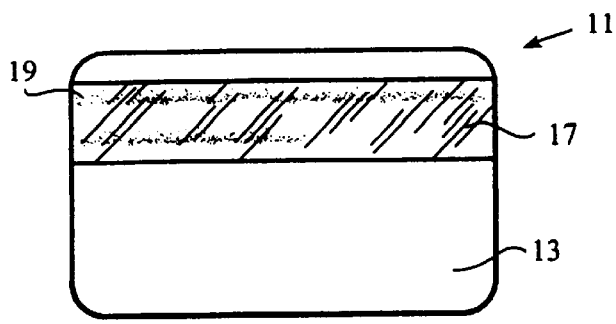
FIG._1
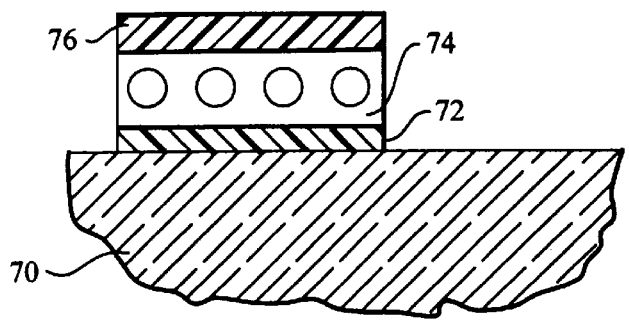
FIG._2
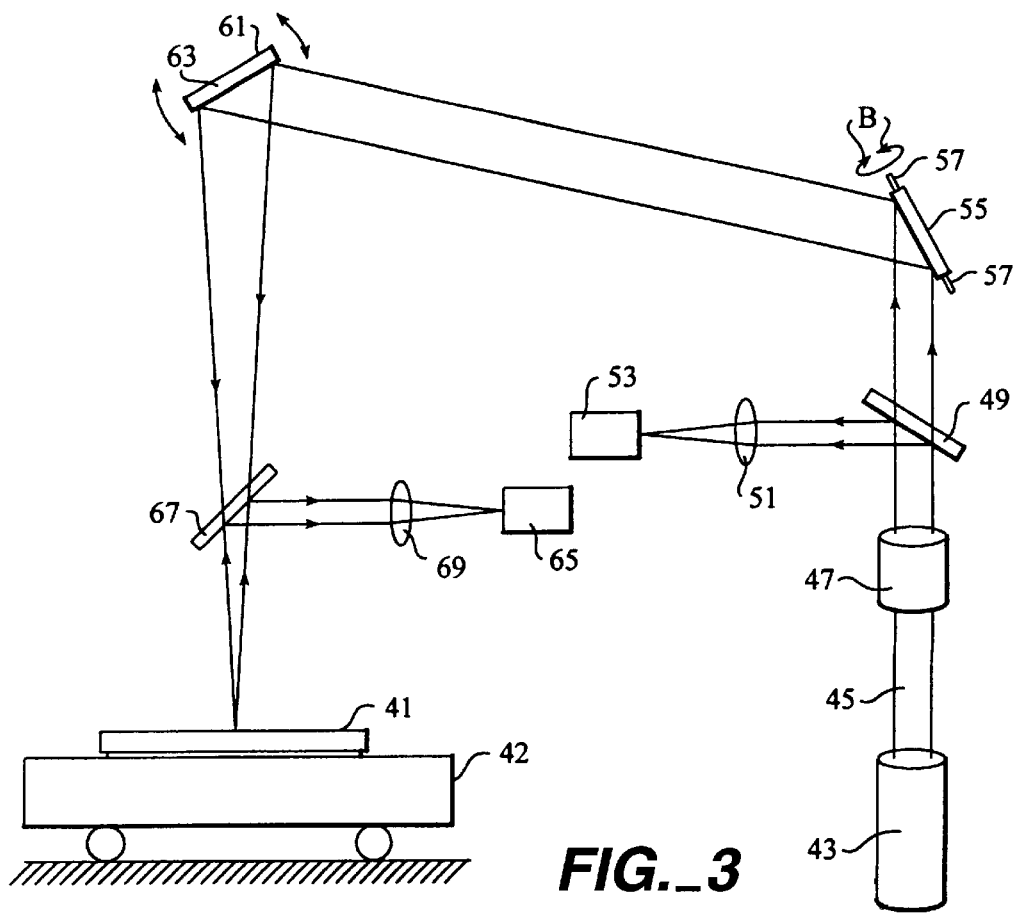
FIG._3

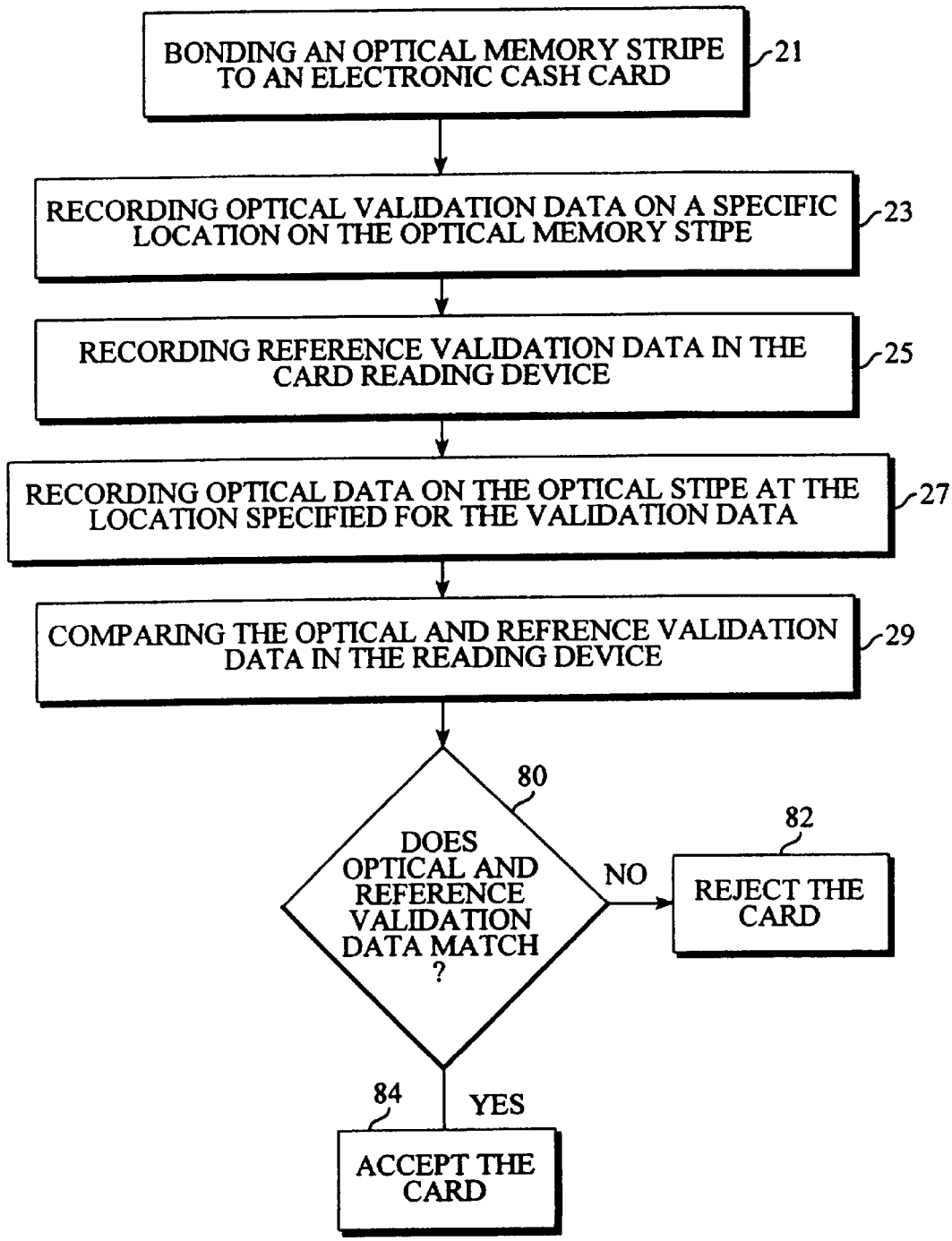
FIG._4

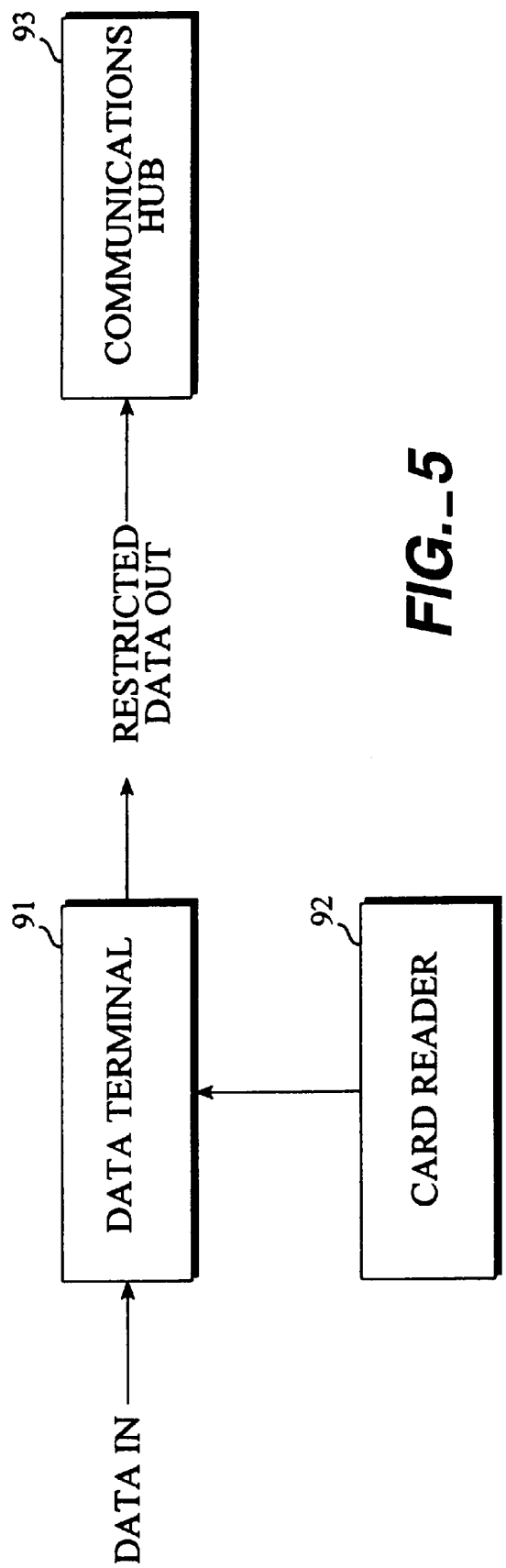

VALIDATION METHOD FOR ELECTRONIC CASH CARDS AND DIGITAL IDENTITY CARDS UTILIZING OPTICAL DATA STORAGE

CROSS REFERENCE TO RELATED APPLICATION

This application is a continuation-in-part of U.S. patent application Ser. No. 08/762,978, filed Dec. 9, 1996 now U.S. Pat. No. 5,932,865.

TECHNICAL FIELD

The present invention relates to optical security methods and apparatus for smart cards.

BACKGROUND ART

Electronic commerce is a method of doing business transactions at a distance and making payments electronically. The Internet, interactive networks and cable and ATM machines are being utilized for electronic commerce. The smart card containing a microchip with semiconductor memory or microprocessor and memory was invented about 18 years ago. During the past few years there have been efforts to store monetary value on such cards which have been called electronic wallets or electronic purses. One of the better known cash card systems is known as the Mondex card or Mondex electronic cash smart cards which is owned by a group of banks and credit card issuers. The Mondex card system and other electronic cash smart cards were promoted as being tamperproof. This attracted the interest of Bell Communications Research (Bellcore) and the Weizmann Institute and the Technion Institute which undertook research to break the microchip security codes. They were successful and reported their results in November 1996 that a valid electronic cash smart card with its security codes can be duplicated, that is, counterfeited. The problem facing the financial institutions was how they could proceed with their plans to build an electronic commerce industry through the Internet and other networks when a principal tool, the electronic cash smart card, was subject to counterfeiting. A very similar problem involves the sending of confidential and/or valuable electronic mail involving contracts, negotiations, agreements, legal analyses, attorney-client communications or communications with corporate officers, vendors or customers. Digital identity cards could be used to regulate or control the transfer or flow of this type of restricted data.

It is the object of the present invention to devise a method and apparatus to inhibit the counterfeiting of electronic cash smart cards and digital identity cards and to achieve enhanced security for electronic commerce and electronic mail.

DISCLOSURE OF THE INVENTION

The above objective has been met by a smart card having a pre-formatted optical memory stripe bonded to a plastic wallet-size substrate containing an electronic cash microchip or microchip used with a digital identity card. The data tracks on the optical memory stripe would be typically separated by 12 microns or 7.5 microns and would use recorded spots from one to three microns in diameter. The card validation data would comprise one thousand to one million of recorded spots.

The validation data could be recorded with a lower power laser apparatus by the bank or card issuer. The validation data could also be recorded by the card manufacturer onto the card using either a low power laser or photolithographic techniques. Under some security arrangement the validation could comprise recordings of both the card manufacturer and the card issuer. Various versions of the validation could be recorded at multiple locations on the optical memory stripe.

Whereas counterfeiters have access to customer microchip manufacturing, there are only three optical memory card manufacturers in the world. Each of these three optical card manufacturers uses different and distinguishing optical storage media. It requires about $20 million and a high degree of technical know how to build such a manufacturing plant. One such optical memory card manufacturing plant exists in the U.S.A. and two in Japan using security controls on the manufacturing and distribution of the optical memory portion of the card and on the laser writing apparatus such technology can be kept out of the hands of the counterfeiters.

The validation data must be read optically and utilized to thwart the counterfeiter. The method and apparatus for reading the data will involve either CCD arrays, other photodetector arrays or a single photodetector. The photodetector array could be of the linear variety or a single photodetector could be used, in both cases the card would have to be in motion. In the case of a two-dimensional photodetector array the card would not require motion but instead the validation data images would be scanned electronically. The use of two dimensional CCD arrays to read data from an optical memory is described in U.S. Pat. Nos. 4,745,484 and 4,864,630. The use of a linear photodetector array to read optical memory is described in U.S. Pat. No. 4,634,850. The use of a single photodetector to read an optical memory is described in U.S. Pat. Nos. 4,500,777 and 4,544,835. Validation data could be recorded as visual images by photolithography or with a laser as described in U.S. Pat. Nos. 4,680,459 and 4,814,594.

The validation data on the electronic cash smart card or digital identity card is read by a reading device containing photodetectors and electronically compared against stored reference data to determine the validity of the electronic cash card or digital identity card before funds are dispersed or data transferred. These functions could be carried out in a public kiosk as part of an electronic commerce or electronic mail system. Just as a vending machine would reject counterfeit coins or currency the public kiosk would reject a card not containing key elements of the validation data.

Validation data may also be confirmed by the recipient of the money transfer or electronic mail. The validation data from the payor's location or data sender's location would be transmitted to the payee's location or data recipient's location where the validation data would be compared against reference data to determine its validity before the money transfer would be accepted by the payee or data accepted by the recipient.

Various versions of the validation data in digital or image form, can be stored at multiple locations on the optical memory stripe. The card reading device would store some of the validation versions. The selection of the validation version or versions to be used as a reference for matching could be made by either a human being, the card reader device or the optical memory stripe reading device.

The digital identity card could be used for a number of purposes including controlling the transfer or flow of confidential and/or valuable electronic mail involving any one of the following applications: attorney-client communications, negotiations, contracts, agreements or communications with corporate officers, vendors or customers.

BRIEF DESCRIPTION OF THE DRAWINGS

FIG. 1 is a top plan view of a smart card in accord with the present invention.

FIG. 2 is an enlarged view of a thin optical recording strip on a card in accord with FIG. 1.

FIG. 3 is a plan view of optical apparatus for in-situ writing on the optical recording material of the card of FIG. 1.

FIG. 4 is a flow chart showing steps in the method of the present invention.

FIG. 5 is a block diagram of a system for using digital identity cards.

BEST MODE FOR CARRYING OUT THE INVENTION

With reference to FIG. 1, a smart card 11 is illustrated having a size common to most credit cards. The card's substrate material 13 is a dielectric, usually a plastic such as polyvinyl chloride or similar material carrying a chip inside, for example, as shown in U.S. Pat. Nos. 5,365,655 and 5,134,773. Polycarbonate is preferred. The surface finish of the base should have low specular reflectivity, preferably less than 10%.

Substrate 13 carries strip 17. The strip is typically 16 or 35 millimeters wide and extends the length of the card. Alternatively, the strip may have other sizes and orientations. The strip is relatively thin, typically 60–200 microns, although this is not critical. Strips of laser recording material may be applied to both sides of card 11. The strip may be applied to the card by any convenient method which achieves flatness.

The strip 17 is adhered to the card with an adhesive and is covered by a transparent laminating sheet 76 seen in FIG. 3 which serves to keep strip 17 flat, as well as protecting the strip from dust and scratches. Sheet 76 is a thin, transparent plastic sheet laminating material or a coating, such as a transparent lacquer. The material is preferably made of polycarbonate plastic.

The high resolution laser recording material which forms strip 17 may be any of the reflective recording material which have been developed for use as direct read-after-write (DRAW) optical disks, so long as the materials can be formed on thin substrates. An advantage of reflective materials over transmissive materials is that the read/write equipment is all on one side of the card, the data storage capacity is doubled and automatic focus is easier. For example, the high resolution material described in U.S. Pat. No. 4,230,939 issued to de Bont, et al. teaches a thin metallic recording layer of reflective metals such as Bi, Te, Ind, Sn, Cu, Al, Pt, Au, Rh, As, Sb, Ge, Se, Ga.

Materials which are preferred are those having high reflectivity and low melting point, particularly Cd, Sn, Tl, Ind, Bi and amalgams. Suspensions of reflective metal surfaces in organic colloids also form low melting temperature laser recording media. Silver is one such metal. Typical recording media are described in U.S. Pat. Nos. 4,314,260; 4,298,684; 4,278,758; 4,278,756 and 4,269,917, all assigned to the assignee of the present invention.

The laser recording material which is selected should be compatible with the laser which is used for writing on it. Some materials are more sensitive than others at certain wavelengths. Good sensitivity to infrared light is preferred because infrared is affected least by scratches and dirt on the transparent laminating sheet. The selected recording material should have a favorable signal-to-noise ratio and form high contrast data bits with the read/write system with which it is used.

The material should not lose data when subjected to temperatures of about 180° F. (82° C.) for long periods. The material should also be capable of recording at speeds of at least several thousand bits/sec. This generally precludes the use of materials that require long heating times or that rely on slow chemical reactions in the presence of heat, which may permit recording of only a few bits/sec. A large number of highly reflective laser recording materials have been used for optical data disk applications.

Data is recorded by forming spots in the surrounding field of the reflective layer itself, thereby altering the reflectivity in the data spot. Data is read by detecting the optical reflective contrast between the surrounding reflective field of unrecorded areas and the recorded spots. Spot reflectivity of less than half the reflectivity of the surrounding field produces a contrast ratio of at least two to one, which is sufficient contrast for reading. Greater contrast is preferred. Reflectivity of the strip field of about 50% is preferred with reflectivity of a spot in the reflective field being less than 10%, thus creating a contrast ratio of greater than five to one. Alternatively, data may also be recorded by increasing the reflectivity of the strip. For example, the recording laser can melt a field of dull microscopic spikes on the strip to create flat shiny spots. This method is described in SPIE, Vol. 329, Optical Disk Technology (1982), p. 202. A spot reflectivity of more than twice the surrounding spiked field reflectivity produces a contrast ratio of at least two to one, which is sufficient contrast for reading.

Data strip 17 is intended to provide a data record and has digital information indicia. Digital machine readable data is written in individual tracks extending in a longitudinal direction, as indicated by the spot patterns 19 and these spot patterns are analogous to sound track on a film, except that the data tracks contain a much higher density of information and are usually read in reflection, rather than in transmission, typically by a CCD array. The information density is greater because each of the spots in the spot pattern is approximately 5–10 microns in diameter with a spacing of about 5–10 microns between spots. The spots are recorded by a laser in the usual way, for example as shown in U.S. Pat. No. 4,278,756 to Bouldin et al.

With reference to FIG. 2, a card substrate 70 carries an optional secondary substrate 72 which is a thin flexible material, only a few mils thick carrying a laser recording material 74. The secondary substrate 72 is adhered to the primary substrate 70 by means of an adhesive or sticky substance, similar to dry adhesives found on tape. The laser recording material may be any of the materials previously discussed. A protective coating 76 is applied over the laser recording material.

A laser writing apparatus is illustrated in FIG. 3 which illustrates the side view of the lengthwise dimension of the medium of FIG. 1 consisting of a data strip having digital information in combination with microscopic visually readable information on a card. The data strip portion 41 of the medium is usually received in a movable holder 42 which brings the strip into the trajectory of a laser beam. A laser light source 43, preferably a pulsed semiconductor laser of infrared wavelength emits a beam 45 which passes through collimating and focusing optics 47. The beam is sampled by a beam splitter 49 which transmits a portion of the beam through a focusing lens 51 to a photodetector 53. The detector 53 confirms laser writing. The beam is then directed to a first servo controlled mirror 55 which is mounted for rotation along axis 57 in the direction indicated by arrows B. The purpose of the mirror 55 is to find the lateral edges of the data strip in a coarse mode of operation and then in a fine mode of operation identify data paths or character sites which exist predetermined distances from the edges.

From mirror 55, the beam is directed toward a mirror 61. This mirror is mounted for rotation at pivot 63. The purpose of mirror 55 is for fine control of motion of the beam along the length of the data strip. Coarse control of the lengthwise portion of the data strip relative to the beam is achieved by motion of the movable holder 42. The position of the holder may be established by a linear motor and used by a closed loop position servo system of the type used in magnetic disk drives. Reference position information may be prerecorded on the card so that position error signals may be generated and used as feedback in motor control. Upon reading one data path, the mirror 55 is slightly rotated. The motor moves holder 42 lengthwise so that the path can be read again, and so on.

For writing microscopic visually readable information, mirror 55 is used to identify character sites at predetermined distances from the edges. Mirror 57 moves the scanning beam lengthwise from character site to character site. Upon reading one row of character sites, mirror 55 is slightly rotated. Within a character site, mirrors 55 and 57 cooperate to move the beam in either a zig-zag pattern or a raster-like pattern. Laser spots are written at designated locations within a character site to form a character. When one character is written mirrors 55 and 57 move the beam to the next character site.

As light is scattered and reflected from spots in the laser recording material, the percentage of reflected light from the incident beam changes relative to surrounding material where no spots exist. The incident laser beam should deliver sufficient laser energy to the surface of the recording material to create spots in the data writing mode, but should not cause disruption of the surface so as to cause difficulty in the lower beam power data reading mode. The wavelength of the laser should be compatible with the recording material to achieve this purpose. In the read mode, power is approximately 5% to 10% of the recording or writing power.

Differences in reflectivity between a spot and surrounding material are detected by a CCD array, either a linear array or area array. The number of detector elements per track would be approximately three elements to create a reading redundancy. The surface would be illuminated with low-cost light-emitting diodes generating power primarily in the near infrared to match the sensitivity spectrum of the photodetector array.

Once a card is prepared, with either prerecorded information on the optical strip or with laser written information, the extended information must be sufficiently complex to prevent easy replication. For example, a pattern of one million spots, being the digital representation of a random number, might be an authentication "password" or validation data. A group of numbers, representing a card serial number, date of card issuance, geographical location of issuer and types of purchases not permitted could be encoded with the spots. When this password or verification data is matched with another password associated with an electronic reader, a verification signal is generated, indicating an authentic card. The reader may be linked electronically with a password server or the passwords may be stored in a memory local to the reader.

The passwords may be prerecorded by the card manufacturer, using a photolithography process or a laser process, as described above. Alternatively, the password may be written by a card-issuing agency or by both the card manufacturer and the card-issuing agency. Passwords or validation data could be limited in use to a group of issuers.

The method of validating the card is summarized in FIG. 4. Referring to the flow chart, in step 21, an optical memory stripe would be bonded to an electronic card. Then, in step 23, optical validation data would be recorded on a specific location on the optical memory stripe. Alternatively, various versions of the validation data could be recorded at multiple locations on the memory stripe. This data could be in digital or image form. Next, in step 25, reference validation data would be recorded in the card reading device. Then, in step 27, optical data on the optical stripe would be read at the location specified for the validation data. Alternatively, if the data is recorded in multiple locations, a specific version of the validation data is selected amongst the multiple locations that the various versions of the validation data are stored. The optical data could then be read at the selected locations specified for this validation data. Then, in step 29, the optical and reference validation in the reading device are compared. A decision 80 is then made as to whether the optical and reference validation data match. If so, the card is accepted 84. If the data do not match, the card is rejected 82.

With reference to FIG. 5, the method of the present invention can be used in a system which uses a digital identity card to regulate or control the transfer or flow of restricted data, such as confidential and/or valuable electronic mail involving contracts, negotiations, agreements, legal analyses, attorney-client communications or communications with corporate officers, vendors or customers and the like. A stream of data communications is transmitted and stored in a data terminal 91 which is attached to a card reader 92. In the present invention, it is desired to control the transfer or flow of the restricted data from the data terminal 91 to a destination, such as communications hub 93. The communications hub 93 can be another data terminal, the Internet, or any other location to where the data can be transferred. The digital identity card is used with the card reader 92 according to the method of the present invention, described above, in order to control the transfer or flow of the stream of data from the data terminal 91 to the communications hub 93, by enabling or disabling transmission of the data. The control decision as to whether or not to send the restricted data to the communications hub 93 is based on acceptance of the digital identity card, which in turn is determined by whether or not there is a match between the validation data on the digital identity card and the reference validation data stored in the card reader 92.

What is claimed is:

1. A method of validation of an electronic cash card comprising, bonding an optical memory stripe to the card, recording digital optical validation data on a specific location on the optical memory stripe by forming a plurality of spots in a surrounding field of a reflective layer in a laser recording material, recording digital reference validation data in the card reading device, reading digital optical data on the optical stripe at the location specified for the validation data by detecting an optical reflective contrast between the surrounding field and the recorded spots, comparing the optical and reference digital validation data in the reading device, accepting or rejecting the electronic cash card depending upon whether the optical validation data matches the reference validation data.

2. A method of validation of an electronic cash card comprising, bonding an optical memory stripe to the card, recording optical validation data in a form of visual images on a specific location on the optical memory stripe by forming a plurality of spots in a surrounding field of a reflective layer in a laser recording material, recording reference validation data in the card reading device, reading optical data in the form of visual images on the optical stripe at the location specified for the validation data by detecting an optical reflective contrast between the surrounding field and the recorded spots, comparing the optical and reference validation data in the reading device, accepting or rejecting the electronic cash card depending upon whether the optical validation data matches the reference validation data.

3. A method of validation of an electronic cash card comprising, bonding an optical memory stripe to the card, recording various versions of optical validation data in multiple locations on the optical memory stripe by forming a plurality of spots in a surrounding field of a reflective layer in a laser recording material, recording various versions of reference validation data in the card reading device, selecting a specific version of the validation data at selected locations amongst the multiple locations that the various versions of the validation data are stored, reading optical data on the optical stripe at the selected locations specified for the validation data by detecting an optical reflective contrast between the surrounding field and the recorded spots, comparing the optical and reference validation data in the reading device, accepting or rejecting the electronic cash card depending upon whether the optical validation data matches the reference validation data.

4. The method of claim 3 where the selection of a specific version of the validation data is made by a card reading device.

5. The method of claim 3 where the selection of a specific version of the validation data is made by a device that reads the optical stripe.

6. The method of claim 3 where the selection of a specific version of the validation data is made by a human being.

7. A method of validation of a digital identity card comprising, bonding an optical memory stripe to the card, recording digital optical validation data on a specific location on the optical memory stripe by forming a plurality of spots in a surrounding field of a reflective layer in a laser recording material, recording digital reference validation data in the card reading device, reading digital optical data on the optical stripe at the location specified for the validation data by detecting an optical reflective contrast between the surrounding field and the recorded spots, comparing the optical and reference digital validation data in the reading device, accepting or rejecting the digital identity card depending upon whether the optical validation data matches the reference validation data.

8. The method of claim 7 further defined by establishing a stream of data communications and controlling the flow of said stream by acceptance of the digital identity card.

9. A method of validation of a digital identity card comprising, bonding an optical memory stripe to the card, recording various versions of optical validation data in multiple locations on the optical memory stripe by forming a plurality of spots in a surrounding field of a reflective layer in a laser recording material, recording various versions of reference validation data in the card reading device, selecting a specific version of the validation data at selected locations amongst the multiple locations that the various versions of the validation data are stored, reading optical data on the optical stripe at the selected locations specified for the validation data by detecting an optical reflective contrast between the surrounding field and the recorded spots, comparing the optical and reference validation data in the reading device, accepting or rejecting the digital identity card depending upon whether the optical validation data matches the reference validation data.

10. The method of claim 9 where the selection of a specific version of the validation data is made by a card reading device.

11. The method of claim 9 where the selection of a specific version of the validation data is made by a device that reads the optical stripe.

12. The method of claim 9 where the selection of a specific version of the validation data is made by a human being.

13. The method of claim 9 further defined by establishing a stream of data communications and controlling the flow of said stream by acceptance of the digital identity card.

* * * * *